United States Patent
Nakagawa et al.

(10) Patent No.: US 9,727,403 B2
(45) Date of Patent: Aug. 8, 2017

(54) SYSTEM AND METHOD FOR DETECTING AN ABNORMAL CONDITION IN A MULTI-NODE COMMUNICATION SYSTEM

(71) Applicant: FUJITSU LIMITED, Kawasaki-shi, Kanagawa (JP)

(72) Inventors: Mio Nakagawa, Yokohama (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 14/742,842

(22) Filed: Jun. 18, 2015

(65) Prior Publication Data

US 2016/0041863 A1 Feb. 11, 2016

(30) Foreign Application Priority Data

Aug. 7, 2014 (JP) ................................. 2014-161251

(51) Int. Cl.
*G06F 11/07* (2006.01)
*G06F 11/30* (2006.01)

(52) U.S. Cl.
CPC ...... *G06F 11/0772* (2013.01); *G06F 11/0709* (2013.01); *G06F 11/0751* (2013.01); *G06F 11/0784* (2013.01); *G06F 11/3065* (2013.01)

(58) Field of Classification Search
CPC ............. G06F 11/0709; G06F 11/0751; G06F 11/0784; G06F 11/30; G06F 11/3096; H04W 72/042

See application file for complete search history.

(56) References Cited

U.S. PATENT DOCUMENTS

| | | | |
|---|---|---|---|
| 5,928,351 A | 7/1999 | Horie et al. | |
| 9,032,118 B2* | 5/2015 | Sugawara | G06F 12/00 710/38 |
| 2003/0067867 A1* | 4/2003 | Weis | H04L 41/0663 370/210 |

(Continued)

FOREIGN PATENT DOCUMENTS

| | | |
|---|---|---|
| JP | 10-49507 | 2/1998 |
| JP | 2000-187598 | 7/2000 |
| WO | WO 2014/103078 A1 | 7/2014 |

*Primary Examiner* — Joseph Schell
(74) *Attorney, Agent, or Firm* — Oblon, McClelland, Maier & Neustadt, L.L.P.

(57) ABSTRACT

A system includes a plurality of information processing apparatuses; and a management apparatus configured to: transmit Hamilton path information including a communication route information and order information indicating a position in a communication order assigned to the each of the plurality of information processing apparatuses, to each of the plurality of information processing apparatuses, and transmit a first message to one or more information processing apparatuses that are free from an abnormal condition according to the communication order, and wherein each of the plurality of information processing apparatuses is configured to: transmit a second message including information about an abnormal condition that has been detected to a next transmission destination that is free from an abnormal condition, when the first message is received, and transmit the information about an abnormal condition that has been detected to the management apparatus, when the next transmission destination fails to be identified.

16 Claims, 20 Drawing Sheets

(56) References Cited

U.S. PATENT DOCUMENTS

| | | | |
|---|---|---|---|
| 2005/0083834 A1* | 4/2005 | Dunagan | G06F 11/0709 370/221 |
| 2009/0240838 A1* | 9/2009 | Berg | G06F 15/17337 709/252 |
| 2010/0228888 A1* | 9/2010 | Uchi | G06F 3/0605 710/10 |
| 2015/0100828 A1* | 4/2015 | Abedin | H04L 12/24 714/37 |

* cited by examiner

END POINT/START POINT

SYSTEM AND METHOD FOR DETECTING AN ABNORMAL CONDITION IN A MULTI-NODE COMMUNICATION SYSTEM

CROSS-REFERENCE TO RELATED APPLICATION

This application is based upon and claims the benefit of priority of the prior Japanese Patent Application No. 2014-161251, filed on Aug. 7, 2014, the entire contents of which are incorporated herein by reference.

FIELD

The embodiments discussed herein are related to a system and an abnormal condition detection method.

BACKGROUND

Large-scale systems including many nodes are being implemented in recent years. A large-scale system of this type includes three types of nodes: node that executes calculation processing as commanded by the user (this node will be referred to below as the calculation node), node that operates as a file server or a database (DB) server for the calculation server (this node will be referred to below as the input-output (IO) node), and node that manages the entire system (this node will be referred to below as the management node).

One of the important roles of the management node is to monitor abnormal conditions in calculation nodes and IO nodes and, if there is an abnormal condition, to execute processing to deal with the abnormal condition. In a general monitoring method, nodes to be monitored (calculation nodes and IO nodes) and a management node exchange an existence-confirming message with each other at intervals of a predetermined time.

If, however, many nodes are to be monitored, the processing load on the management node becomes large. A possible way to reduce the processing load on the management node is to share the nodes to be monitored among a plurality of management nodes. It is also effective to reduce a processing load on each message.

If, however, there are many nodes to be monitored, even a technology as described above is unable to be said to be sufficient in reduction of a processing load applied to the entire system to detect abnormal conditions. Related art is disclosed in, for example, Japanese Laid-open Patent Publication No. 2000-187598, Japanese Laid-open Patent Publication No. 10-049507, and International Publication Pamphlet No. WO2014/103078.

SUMMARY

According to an aspect of the invention, a system includes a plurality of information processing apparatuses that are mutually coupled through a communication path; and a management apparatus that manages the plurality of information processing apparatuses, wherein the management apparatus is configured to: transmit Hamilton path information including a communication route information and order information indicating a position in a communication order, the position being assigned to the each of the plurality of information processing apparatuses, to each of the plurality of information processing apparatuses, and transmit a first message to one or more information processing apparatuses that are free from an abnormal condition among the plurality of information processing apparatuses, according to the communication order, and each of the plurality of information processing apparatuses is configured to: transmit a second message including information about an abnormal condition that has been detected so far to a next transmission destination that is free from an abnormal condition, when the first message is received, and transmit the information about an abnormal condition that has been detected so far to the management apparatus, when the next transmission destination fails to be identified.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

The policy of this embodiment is to use resources of to-be-monitored nodes to reduce a load on a management node and to suppress a load on each to-be-monitored node from increasing beyond a certain level.

To achieve this policy, the management node performs mutual monitoring through a Hamilton path. Specifically, to-be-monitored nodes under management by a management node are each regarded as a vertex in a graph theory and a link between each two to-be-monitored nodes is regarded as an edge in the graph theory. Links among nodes are handled as a graph.

A Hamilton path is selected from this graph. A Hamilton path is a path that visits each vertex in the graph only once. If a communication route used for node monitoring is set according to this Hamilton path, it is possible to suppress the number of links used in communication and the number of communications. Therefore, it can also be expected that communication latency and interference with other communication (such as communication executed by a job) would be suppressed.

Figure 1:
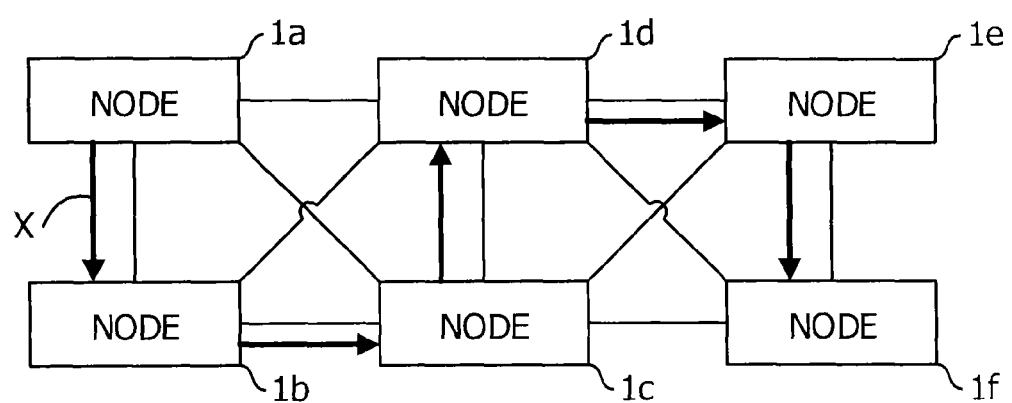
FIG. 1 illustrates a Hamilton path.
Figure 2:
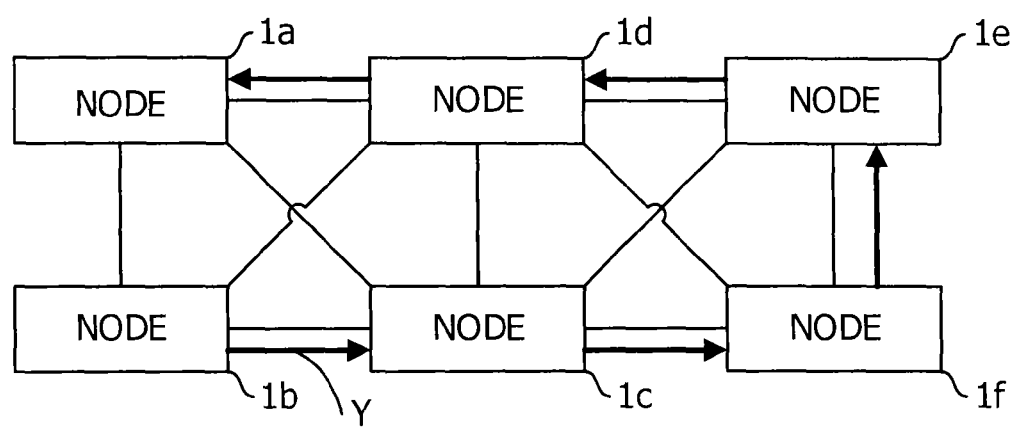
FIG. 2 also illustrates a Hamilton path.

In FIG. 1, a plurality of nodes 1a to 1f are coupled through communication paths. As illustrated in FIG. 1, each node is coupled directly to a plurality of other nodes, that is, there are a plurality of communication routes between each two particular nodes. A Hamilton path X, indicated by the bold arrows, is set so that it visits each of the nodes 1a to 1f only once. In the example in FIG. 1, the Hamilton path X visits nodes 1a, 1b, 1c, 1d, 1e, and 1f in that order. Since, however, there are a plurality of communication routes between each two particular nodes, a plurality of Hamilton paths can also be set. As illustrated in FIG. 2, a Hamilton path Y can also be set for the nodes 1a, 1b, 1c, 1d, 1e, and 1f, which are coupled as in FIG. 1.

Figure 3:
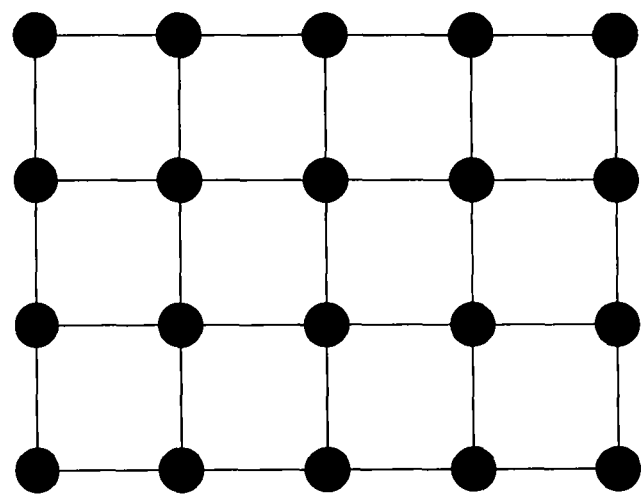
FIG. 3 illustrates an example of nodes coupled like a mesh.

Inter-node links in an information processing system that includes many nodes often take one of two patterns called "mesh" and "torus". In the case of two dimensions, a mesh is formed by setting nodes and inter-node links like a grid, as illustrated in FIG. 3. Also in the case of two dimensions, if at least one wraparound link is added to a mesh between an upper-end node and a lower-end node or between a left-end node and a right-end node as illustrated in FIG. 4, the pattern is a torus.

Figure 5:
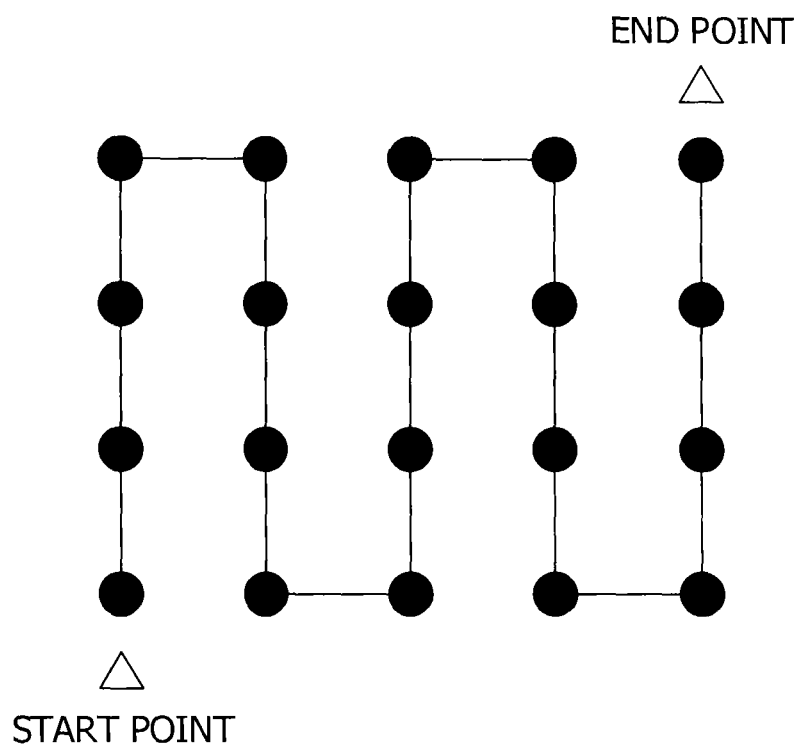
FIG. 5 illustrates an example of a Hamilton path that is set for nodes coupled like a mesh.

A Hamilton path as illustrated in FIG. 5 can be selected from a mesh as illustrated in FIG. 3. Another Hamilton path can also be selected. In the case of three dimensions, a Hamilton path can be similarly selected in a plane linked from the end point in the immediately below plane. If this is repeated for the next dimension, a Hamilton path can be selected from an N-dimensional mesh as well.

Figure 4:
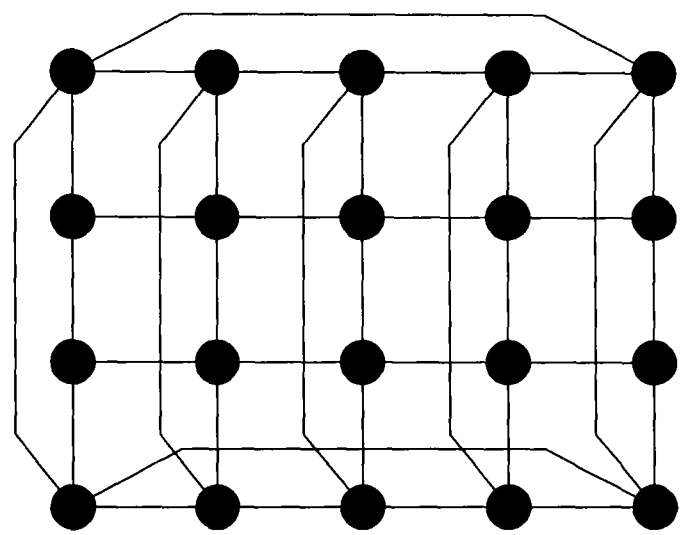
FIG. 4 illustrates an example of nodes coupled like a torus.
Figure 6:
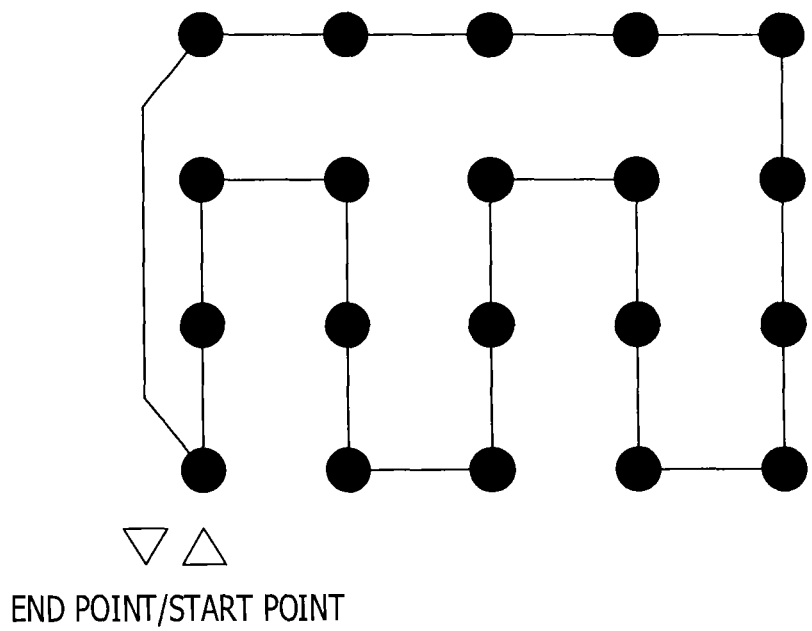
FIG. 6 illustrates an example of a Hamilton path that is set for nodes coupled like a torus.

A Hamilton path as illustrated in FIG. 6 can be selected from a torus as illustrated in FIG. 4. If the torus is expanded as with a mesh, a Hamilton path can be selected in an N-dimensional torus as well. In the case of an N-dimensional torus, a Hamilton closed path, the start point and end point of which are the same, can also be selected.

The structure of a system will be described with reference to FIGS. 7 to 9, in which, to monitor target nodes, a management node sends a monitoring message through a communication route that is set to monitor these nodes along a Hamilton path as described above.

Figure 7:
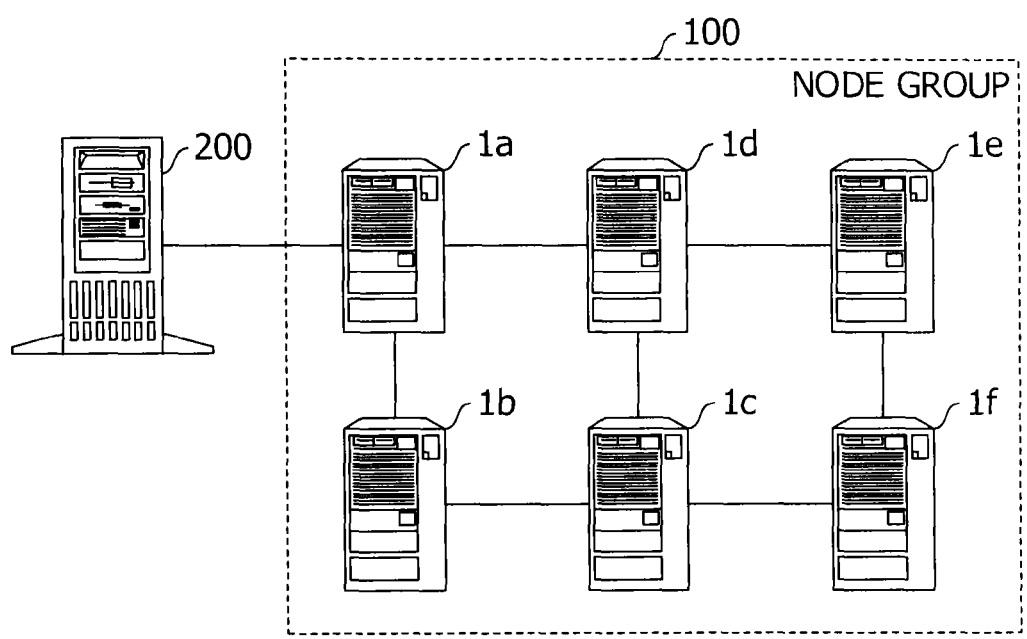
FIG. 7 illustrates an example of an information processing system according to a first embodiment.

FIG. 7 outlines an information processing system. The information processing system includes a management node 200, a to-be-monitored node group 100 (including to-be-monitored nodes 1a to 1f). The management node 200 and each to-be-monitored node 1 in the node group 100 are mutually coupled through, for example, a local area network (LAN).

Figure 8:
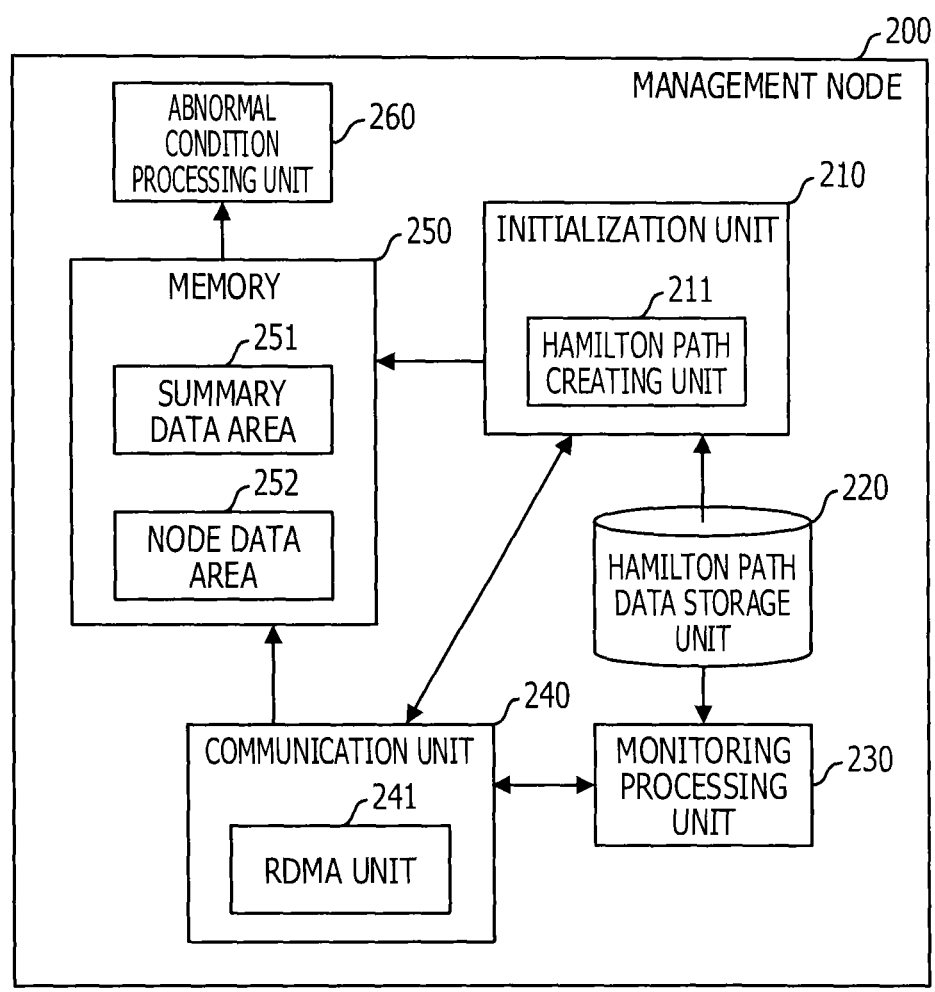
FIG. 8 is a functional block diagram of a management node according to the first embodiment.

FIG. 8 is a functional block diagram of the management node 200. The management node 200 includes an initialization unit 210, a Hamilton path data storage unit 220, a monitoring processing unit 230, a communication unit 240, a memory 250, and an abnormal condition processing unit 260.

The initialization unit 210 includes a Hamilton path creating unit 211. The initialization unit 210 sets Hamilton path data for each to-be-monitored node 1 in the node group 100 through the communication unit 240. The Hamilton path data created by the Hamilton path creating unit 211 is stored in the Hamilton path data storage unit 220.

The monitoring processing unit 230 causes the communication unit 240 to send, for example, a message that flows through the Hamilton path to count the number of abnormal nodes.

The communication unit 240 includes a remote direct memory access (RDMA) unit 241. The RDMA unit 241 accepts RDMA from an RDMA unit in a to-be-monitored node 1 and writes to the memory 250. In RDMA, the to-be-monitored node 1 carries out a transfer to the memory 250 without involving the operating system (OS) in the management node 200, enabling high-throughput communication with low latency. A processing load on the management node 200 can also be reduced.

The memory 250 includes a summary data area 251 and a node data area 252. The summary data area 251 stores summary data about abnormal conditions detected on the Hamilton path such as, for example, the total of abnormal nodes. The node data area 252 stores flags, each of which indicates whether the relevant to-be-monitored node 1 is abnormal, and the like.

The abnormal condition processing unit 260 executes abnormal condition handing processing according to the summary data and node data stored in the memory 250.

Figure 9:
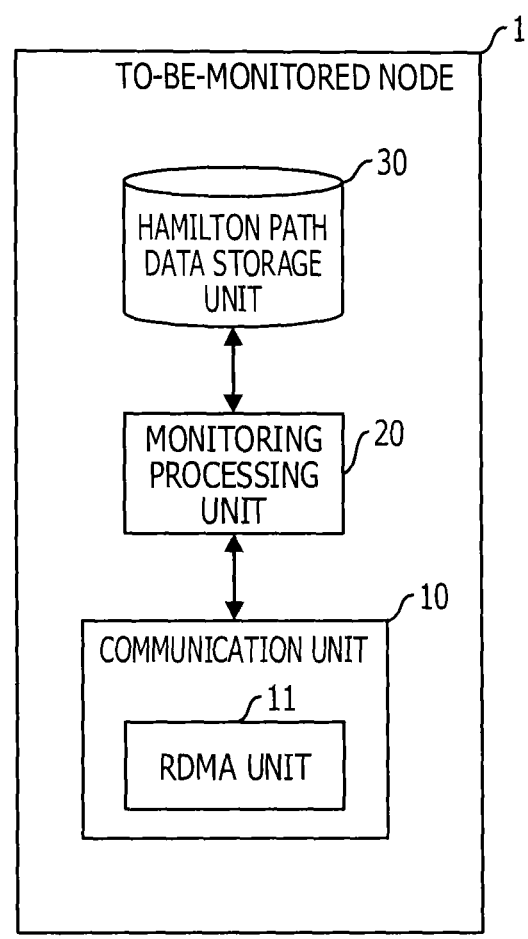
FIG. 9 is a functional block diagram of a to-be-monitored node according to the first embodiment.

FIG. 9 is a functional block diagram of the to-be-monitored node 1. The to-be-monitored node 1 includes a communication unit 10, a monitoring processing unit 20, and a Hamilton path data storage unit 30.

The communication unit 10 includes an RDMA unit 11. The communication unit 10 communicates with another to-be-monitored node 1 or the management node 200. The RDMA unit 11 directly transfers data to the memory 250 through the RDMA unit 241 in the management node 200.

The monitoring processing unit 20 executes processing in relation to a message received at the communication unit 10. The monitoring processing unit 20 sends a message to the other to-be-monitored node 1 through the communication unit 10 or causes the RDMA unit 11 to send data to the management node 200.

The Hamilton path data storage unit 30 stores data about a Hamilton path that has been set.

Next, processing executed by the information processing system according to this embodiment will be described with reference to FIGS. 10 to 12. In this embodiment, the nodes in node groups 100 are coupled in an N-dimensional mesh.

Figure 10:
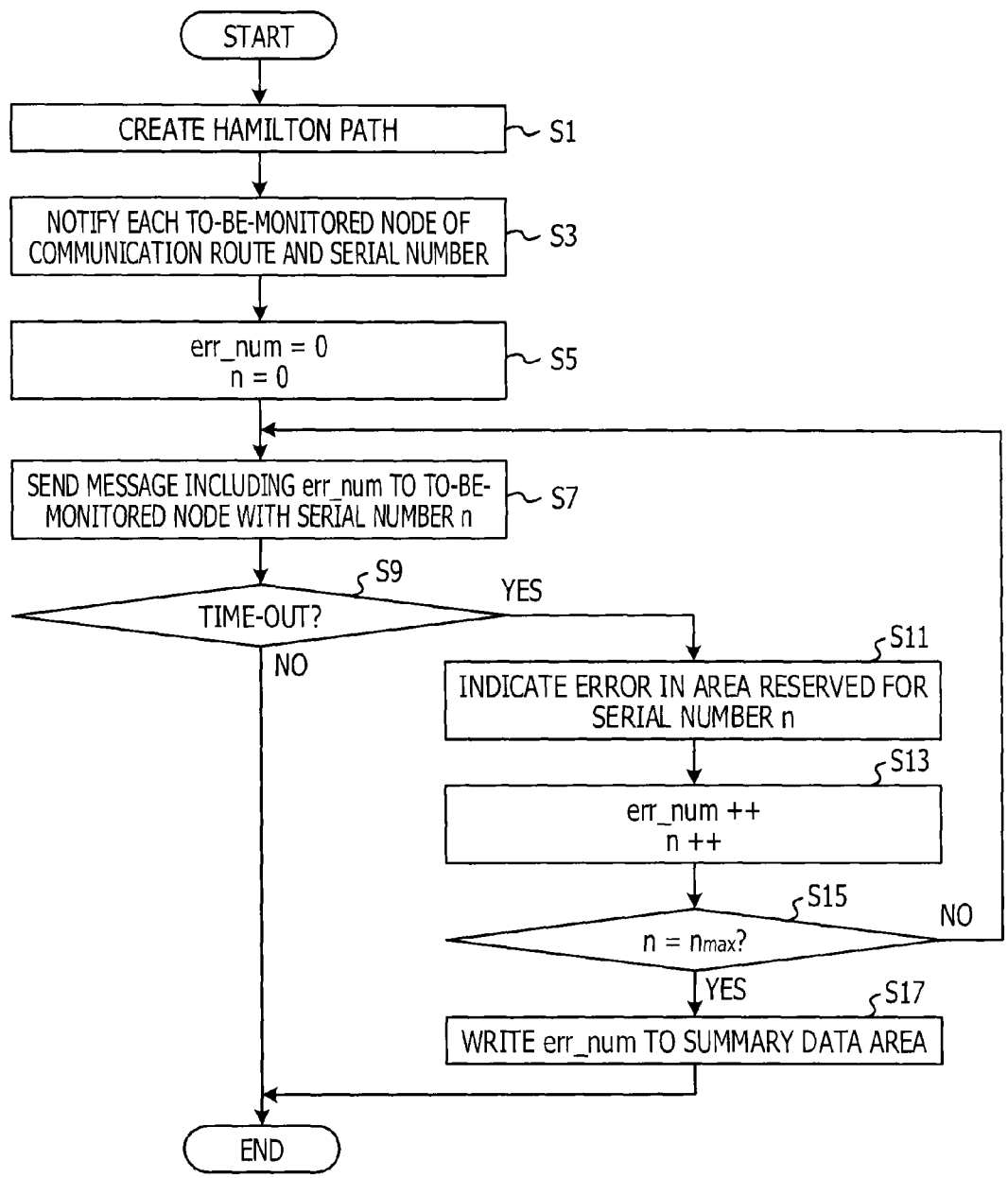
FIG. 10 illustrates a flow of processing executed by the management node according to the first embodiment.
Figure 11:
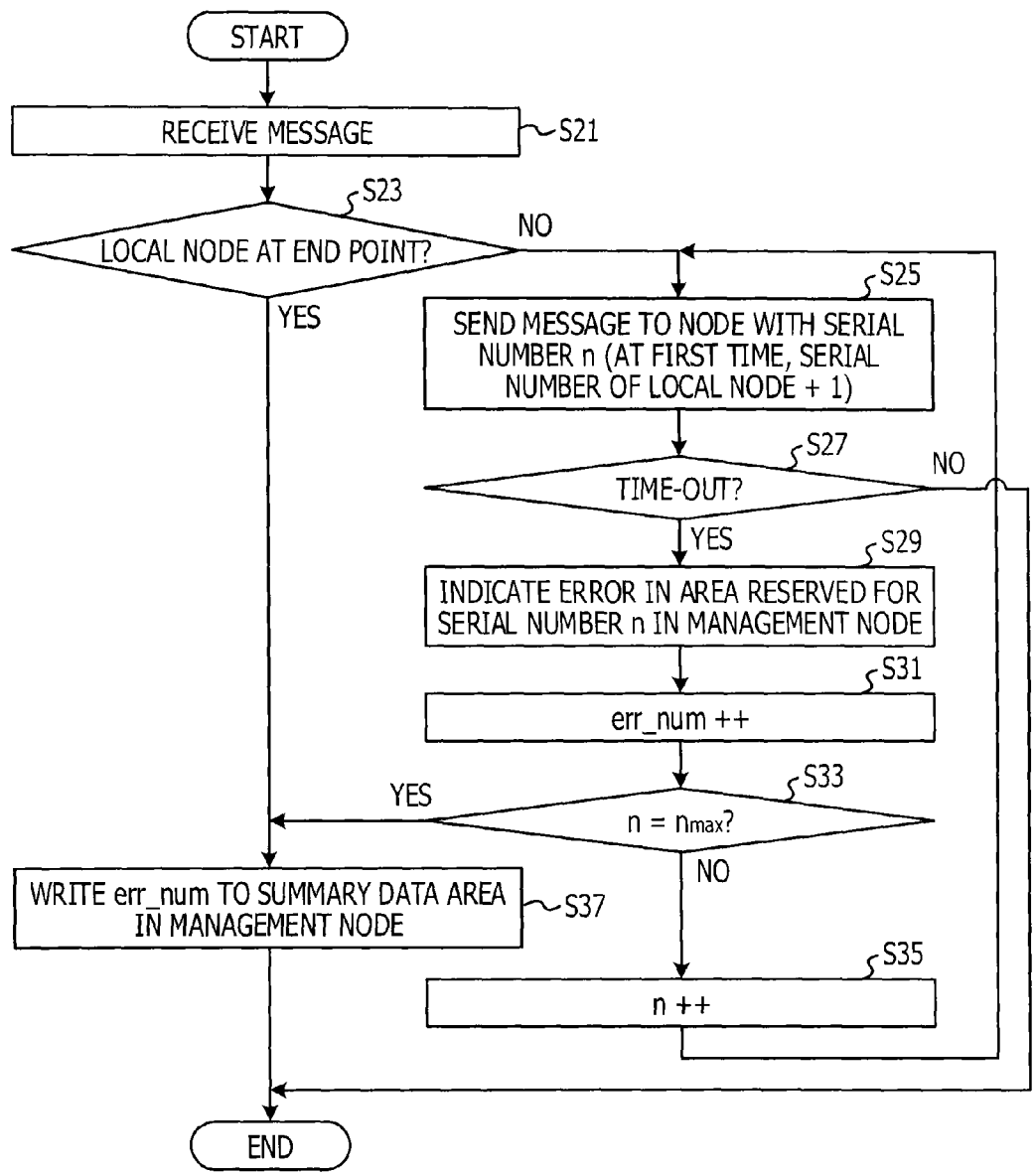
FIG. 11 illustrates a flow of processing executed by a to-be-monitored node according to the first embodiment.

First, the Hamilton path creating unit 211 in the initialization unit 210 creates a Hamilton path according to a certain algorithm and stores the created Hamilton path in the Hamilton path data storage unit 220 (S1 in FIG. 10). The certain algorithm may be any of conventional algorithms, so its description will be omitted here. A Hamilton path may be given by the manager in advance, in which case processing in S1 is skipped.

Next, the initialization unit 210 causes the communication unit 240 to notify each to-be-monitored node 1 of Hamilton path data including a communication route and a serial number (S3). It is desirable for a node, on the Hamilton path, next to the local node to be operating normally. If the next node is not operating normally, processing to search for a node that is operating normally is executed as described below. Therefore, the initialization unit 210 distributes data about nodes on the Hamilton path that are behind at least the node that is the distribution destination.

After that, the monitoring processing unit 230 initializes an err_num counter, which indicates the number of abnormal nodes, to 0, the counter indicating the number of abnormal nodes, and also initializes an n counter to 0, the counter indicating the node number (serial number) of the to-be-monitored node string on the Hamilton path (S5).

Next, the monitoring processing unit 230 causes the communication unit 240 to send a message including the value of the err_num counter to the to-be-monitored node 1 with the serial number n (S7). The communication unit 10 in the to-be-monitored node 1 receives the message and replies with, for example, an acknowledgement (ACK) message.

The monitoring processing unit 230 determines whether the communication unit 240 has received an ACK message from the to-be-monitored node 1 with the serial number n within a predetermined time, that is, a time-out has occurred (S9). If the monitoring processing unit 230 determines that a time-out has not occurred, that is, an ACK message has been received from the to-be-monitored node 1 with the serial number n within the predetermined time, the processing by the management node 200 at this stage is terminated.

If the monitoring processing unit 230 determines that a time-out has occurred, that is, an ACK message has not been received from the to-be-monitored node 1 with the serial number n within the predetermined time, the monitoring processing unit 230 indicates an error in an area, in the node data area 252, that is reserved for the serial number n (S11). For example, the monitoring processing unit 230 turns on a relevant error flag.

The monitoring processing unit 230 then increments the err_num counter by one and also increments the n counter by one (S13). The monitoring processing unit 230 determines whether the n counter has reached a to-be-monitored node count $n_{max}$ (S15). That is, the monitoring processing unit 230 determines whether a message has been sent from the management node 200 to all to-be-monitored nodes 1.

If the monitoring processing unit 230 determines that the n counter has not reached the to-be-monitored node count $n_{max}$, the process returns to S7, where the monitoring processing unit 230 sends a message to a next to-be-monitored node 1 on the Hamilton path.

If the monitoring processing unit 230 determines that the n counter has reached the to-be-monitored node count $n_{max}$, this indicates that none of the to-be-monitored nodes 1 is operating normally. In this case, the monitoring processing unit 230 writes the value of the err_num counter, which indicates the number of abnormal nodes, the value being the to-be-monitored node count $n_{max}$, to the summary data area 251 (S17). Then, the process is terminated.

As described above, the monitoring processing unit 230 sends a message indicating the number of detected abnormal messages to a first to-be-monitored node 1, on the Hamilton path, that is operating normally. If none of the to-be-monitored nodes 1 is operating normally, this situation is indicated in the memory 250.

Next, processing executed by each to-be-monitored node 1 will be described with reference to FIG. 11.

The communication unit 10 in the to-be-monitored node 1 receives a message including the value of the err_num counter from another apparatus (S21) and outputs the value of the err_num counter to the monitoring processing unit 20.

The monitoring processing unit 20 determines whether the local node, to which the monitoring processing unit 20 belongs, is the last node on the Hamilton path (S23). If the monitoring processing unit 20 determines that the local node is the last node, the monitoring processing unit 20 commands the RDMA unit 11 to write the value of the err_num counter to the summary data area 251 in the memory 250 in the management node 200 (S37). Then, the process is terminated.

If the monitoring processing unit 20 determines that the local node is not the last node, the monitoring processing unit 20 identifies the to-be-monitored node 1 with the Hamilton path's serial number n, which is stored in the Hamilton path data storage unit 30 (if this step is first executed, the serial number of the local node plus one is set as n). The monitoring processing unit 20 then causes the communication unit 10 to send a message including the value of the err_num counter to the identified to-be-monitored node 1 (S25).

The monitoring processing unit 20 determines whether the communication unit 10 has received an ACK message from the to-be-monitored node 1 with the serial number n within a predetermined time, that is, a time-out has occurred (S27). If the monitoring processing unit 20 determines that a time-out has not occurred, that is, an ACK message has been received from the to-be-monitored node 1 with the serial number n within the predetermined time, the processing on the to-be-monitored node 1 is terminated.

If the monitoring processing unit 20 determines that a time-out has occurred, that is, an ACK message has not been received from the to-be-monitored node 1 with the serial number n within the predetermined time, the monitoring processing unit 20 commands the RDMA unit 11 to indicate an error in an area reserved for the serial number n, the area being in the node data area 252 in the memory 250 included in the management node 200, (S29). For example, the monitoring processing unit 20 turns on a relevant error flag.

The monitoring processing unit 20 increments the value of the err_num counter by one (S31). The monitoring processing unit 20 then determines whether the n counter has reached the to-be-monitored node count $n_{max}$ (S33). That is, on the Hamilton path, the monitoring processing unit 20 determines whether a message has been sent from the current to-be-monitored node 1 to all to-be-monitored nodes 1 that are set behind the local node.

If the monitoring processing unit 20 determines that the n counter has not yet reached the to-be-monitored node count $n_{max}$, the monitoring processing unit 20 increments the value of the n counter by one (S35). Then, the process returns to S25, where the monitoring processing unit 20 sends a message to a next to-be-monitored node 1 on the Hamilton path.

If the monitoring processing unit 20 determines that the n counter has reached the to-be-monitored node count $n_{max}$, the process proceeds to S37. That is, since there is no normal to-be-monitored node 1 on the Hamilton path behind the local node, the monitoring processing unit 20 notifies the management node 200.

In the to-be-monitored node 1, the RDMA unit 11 writes data directly to the memory 250 in the management node 200 through RDMA. Therefore, a processing load on the management node 200 is not increased.

Next, processing executed by the management node 200 after the above monitoring processing has been executed will be described with reference to FIG. 12.

Figure 12:
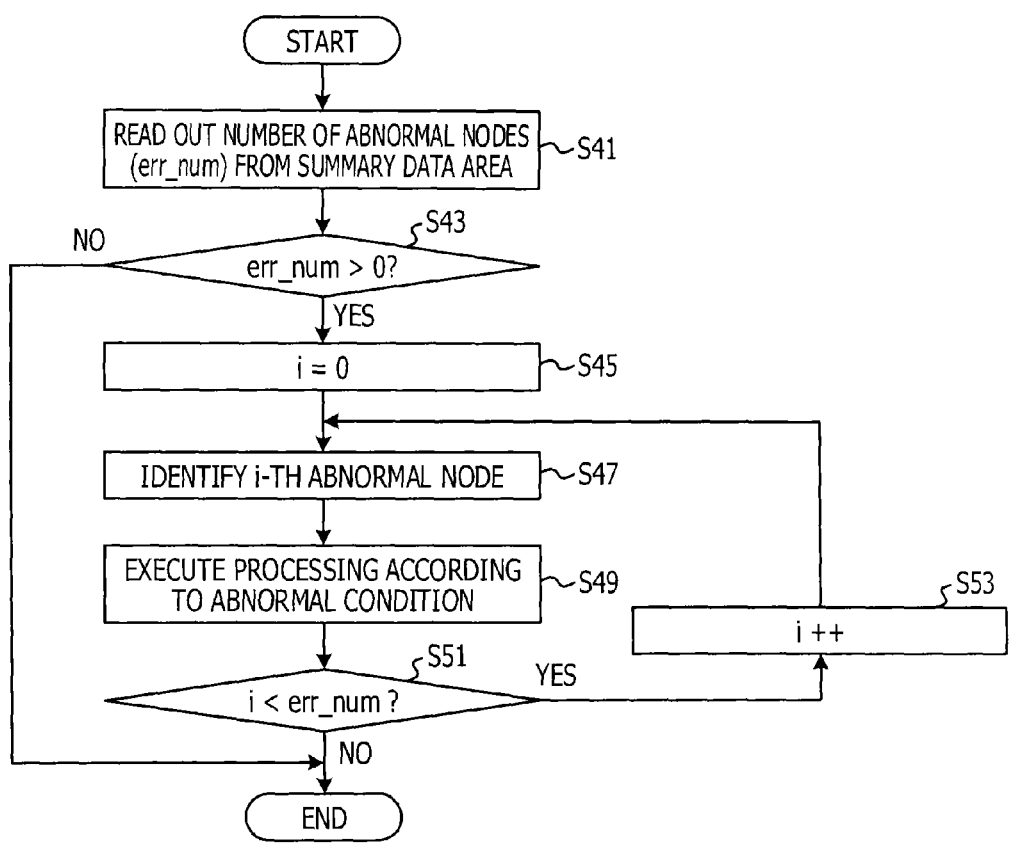
FIG. 12 illustrates a flow of processing executed by the management node according to the first embodiment.

First, the abnormal condition processing unit 260 in the management node 200 reads out the number of abnormal nodes (err_num) from the summary data area 251 in the memory 250 (S41 in FIG. 12).

The abnormal condition processing unit 260 then determines whether the value of the err_num counter exceeds 0 (S43). If the value of the err_num counter is 0, this indicates that all to-be-monitored nodes 1 are operating normally, so the process is terminated.

If the abnormal condition processing unit 260 determines that the value of the err_num counter exceeds 0, the abnormal condition processing unit 260 initializes an i counter to 0 (S45). The abnormal condition processing unit 260 then identifies an i-th abnormal node from the node data area 252 (S47). In a case in which a flag is turned on in response to an abnormal condition, the abnormal condition processing unit 260 identifies an abnormal node corresponding to an i-th turned-on flag.

The abnormal condition processing unit 260 executes processing on the identified abnormal node according to the abnormal condition (S49). Although specific processing is the same as conventional processing and its detailed description will be omitted, the abnormal condition processing unit 260 performs communication again to check the abnormal condition and notifies the manager, for example.

The abnormal condition processing unit 260 then determines whether the value of the i counter is smaller than the value of the err_num counter (S51). If the abnormal condition processing unit 260 determines that the value of the i counter is smaller than the value of the err_num counter, the abnormal condition processing unit 260 increments the value of the i counter by one (S53). Then, the process proceeds to S47.

If the abnormal condition processing unit 260 determines that the value of the i counter is equal to or larger than the value of the err_num counter, the process is terminated. Then, the management node 200 performs error handling processing.

When processing is performed as described above, if no error occurs in each to-be-monitored node 1 or each communication link on a Hamilton path, it is possible to carry out monitoring with only a minimum number of communications along a Hamilton path and RDMA communication from the to-be-monitored node 1 at the end point on the Hamilton path to the management node 200.

If an error occurs in any one of the to-be-monitored nodes 1, the to-be-monitored node 1 writes data to the management node 200. In this case, when RDMA is used, the processing load on the management node 200 can be reduced.

If an error occurs in a communication path on the Hamilton path, a bypass channel other than the Hamilton path is used for communication. This increase the number of links used. However, the use of a Hamilton path originally minimizes the number of links used. Therefore, the probability of being affected by a link failure is minimized.

There are a plurality of Hamilton path selection methods. Even after a link failure has been detected, a Hamilton path can be easily set again.

Second Embodiment

In the first embodiment, an example in which only one Hamilton path is set has been described. If many to-be-monitored nodes are present, the Hamilton path may become too long and too much time may be taken in monitoring.

In this embodiment, to-be-monitored nodes are grouped and a Hamilton path is set for each group so that message transfers are concurrently executed to shorten processing time.

Figure 13:
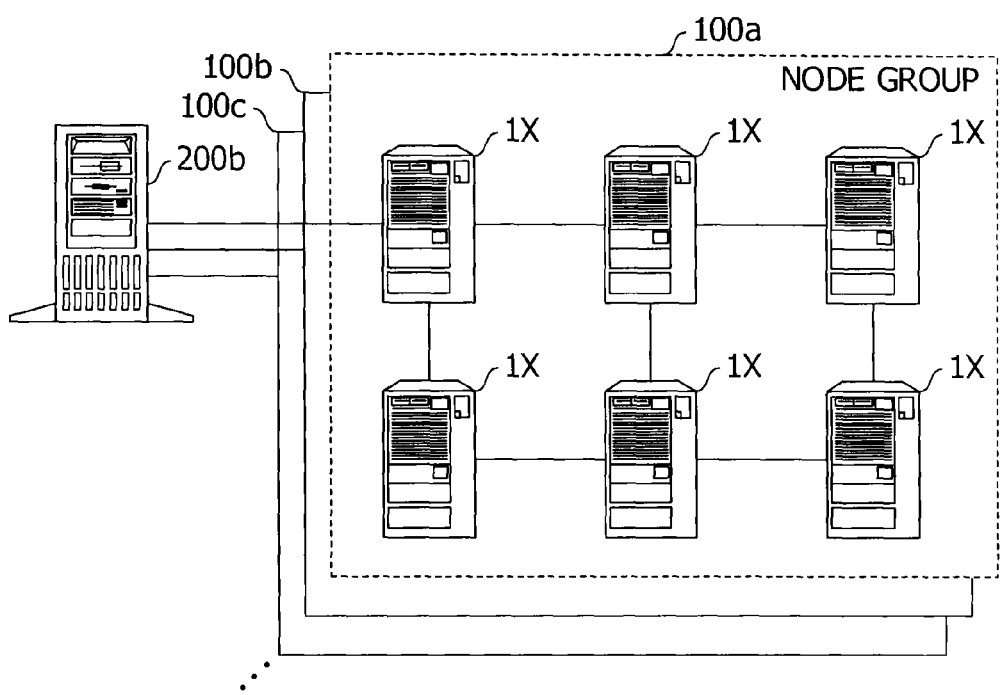
FIG. 13 illustrates an example of an information processing system according to a second embodiment.

FIG. 13 outlines a system according to this embodiment. In this embodiment, a management node 200b is coupled not only to a node group 100a but also to a plurality of other node groups such as a node group 100b and a node group 100c.

Figure 14:
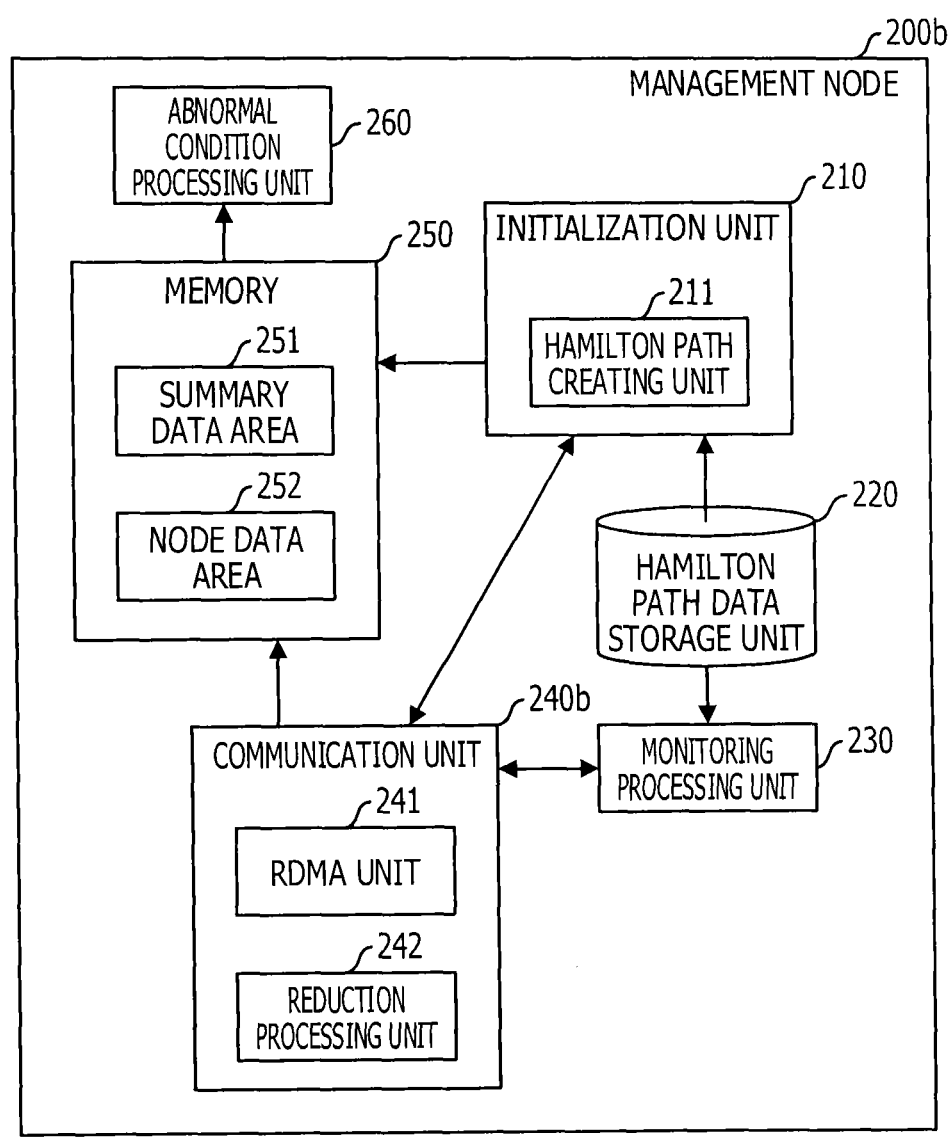
FIG. 14 is a functional block diagram of a management node according to the second embodiment.

FIG. 14 is a functional block diagram of the management node 200b according to this embodiment. The management node 200b differs from the management node 200, illustrated in FIG. 8, according to the first embodiment in that a communication unit 240b is used instead of the communication unit 240. The communication unit 240b includes a reduction processing unit 242 besides the RDMA unit 241. In the node data area 252, areas are allocated for nodes belonging to the node groups 100a, 100b, 100c, and so on.

When called from a to-be-monitored node 1X, the reduction processing unit 242 accumulates a value (err_num) received from the to-be-monitored node 1X to calculate the total sum of the err_num counter. The reduction processing unit 242 then stores the calculated total sum of the err_num counter in the summary data area 251.

Figure 15:
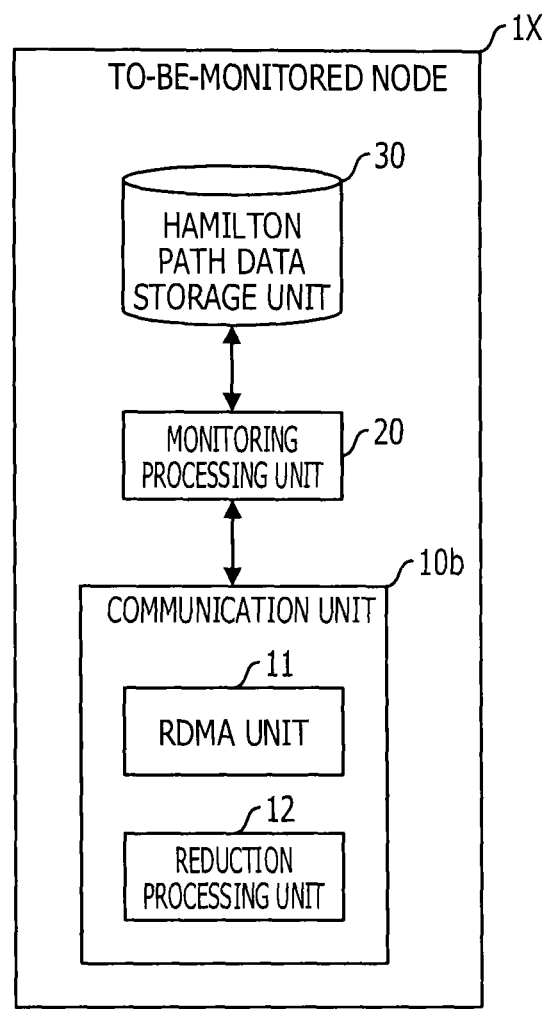
FIG. 15 is a functional block diagram of a to-be-monitored node according to the second embodiment.

FIG. 15 is a functional block diagram of the to-be-monitored node 1X according to the second embodiment. The to-be-monitored node 1X in this embodiment differs from the to-be-monitored node 1 according to the first embodiment differs in that a communication unit 10b is used instead of the communication unit 10 and the communication unit 10b has a reduction processing unit 12 besides the RDMA unit 11. The reduction processing unit 12 calls the reduction processing unit 242 in the communication unit 240b in the management node 200b and sends the value of the err_num counter to the reduction processing unit 242.

Next, processing executed by the management node 200b will be described with reference to FIGS. 16 and 17.

Figure 16:
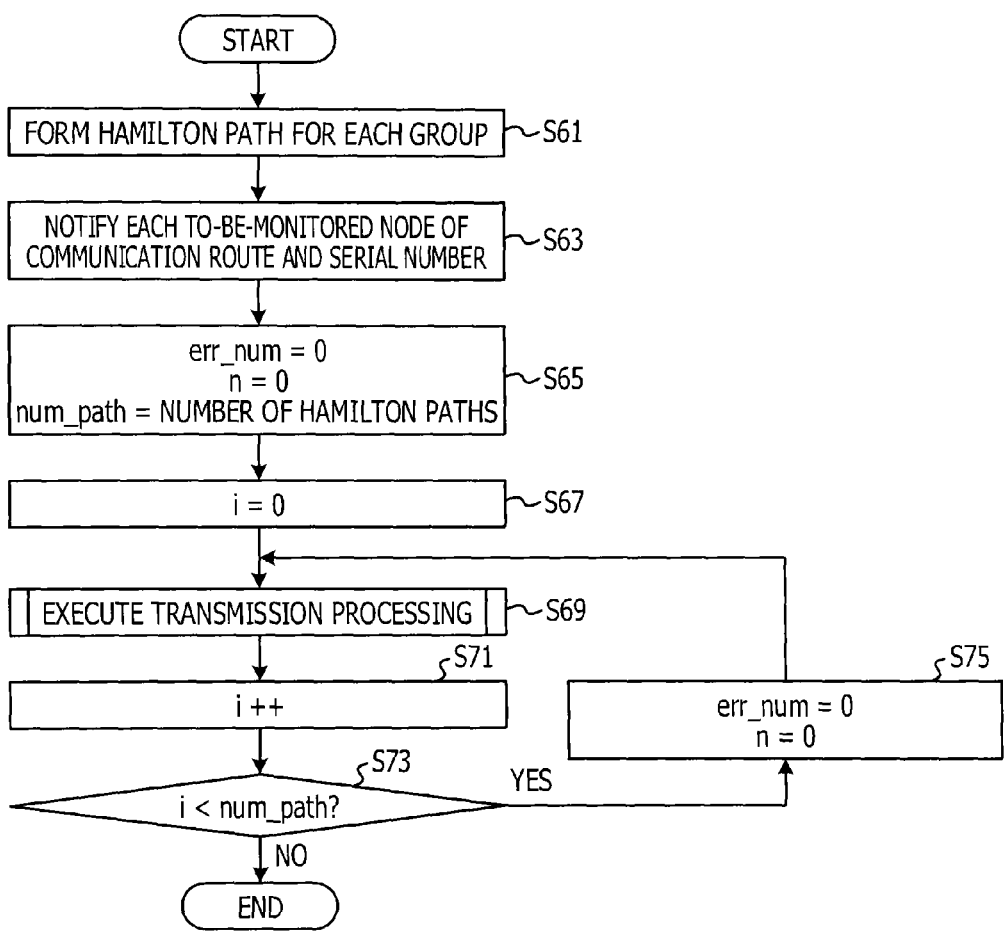
FIG. 16 illustrates a flow of processing executed by the management node according to the second embodiment.
Figure 17:
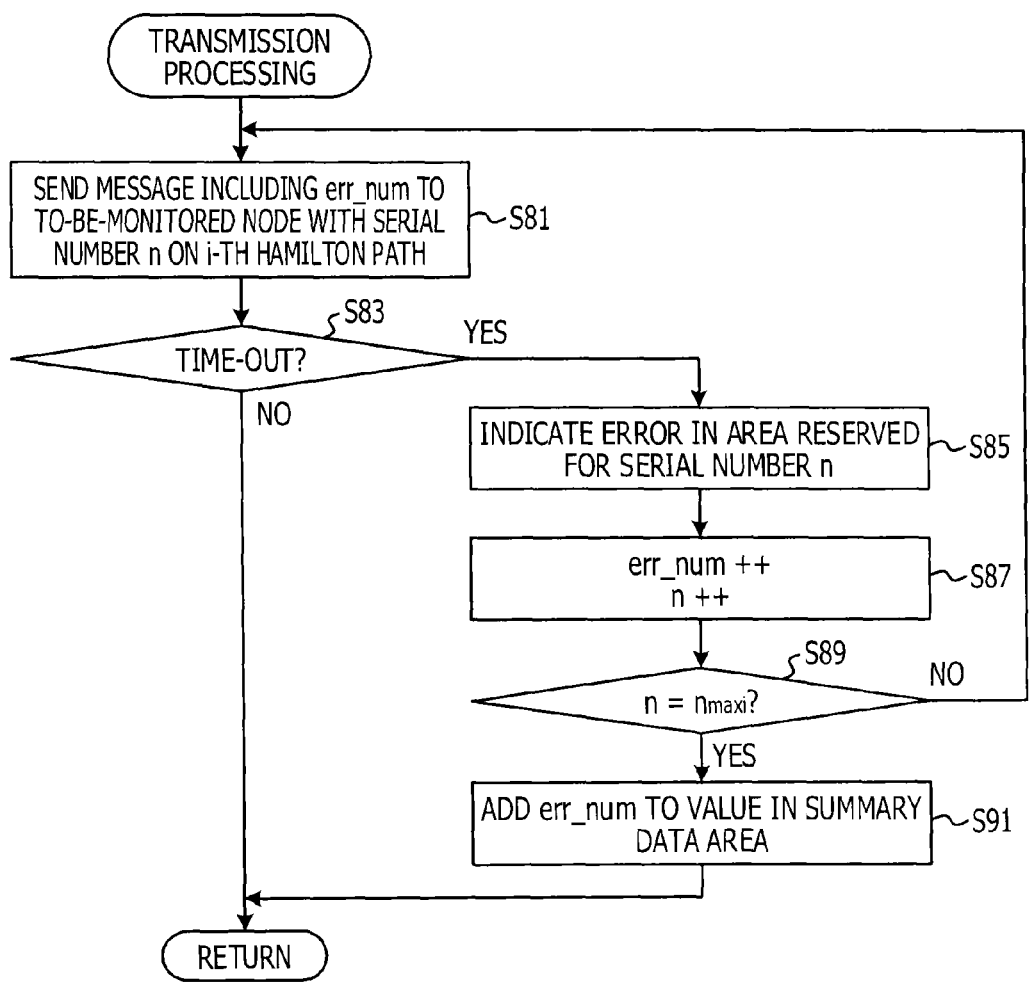
FIG. 17 illustrates flow of transmission processing according to the second embodiment.

The Hamilton path creating unit 211 in the initialization unit 210 first forms a Hamilton path for each group according to a certain algorithm and stores the Hamilton path in the Hamilton path data storage unit 220 (S61 in FIG. 16). This processing is the same as in S1, except that this processing is executed for each node group.

The initialization unit 210 causes the communication unit 240b to notify each to-be-monitored node 1X of Hamilton path data including a communication route and a serial number (S63). This processing is the same as in S3, except that a different Hamilton path is used for a different node group.

Then, the monitoring processing unit 230 initializes the err_num counter, which indicates the number of abnormal nodes, to 0. The monitoring processing unit 230 also initializes the n counter, which indicates the node number (serial number) of the to-be-monitored node string on the Hamilton path, to 0. The monitoring processing unit 230 then sets the number of Hamilton paths (that is, the number of groups) in a num_path counter (S65). The monitoring processing unit 230 further initializes the i counter provided for the node group to 0 (S67).

Next, the monitoring processing unit 230 executes transmission processing for an i-th group (S69). The transmission processing will be described later with reference to FIG. 17.

Upon completion of the transmission processing for the i-th group, the monitoring processing unit 230 increments the value of the i counter by one (S71). The monitoring processing unit 230 then determines whether the value of the i counter is smaller than the value of the num_path counter (S73). If the monitoring processing unit 230 determines that the value of the i counter is smaller than the value of the num_path counter, the monitoring processing unit 230 initializes the n counter to 0 and also initializes the err_num counter to 0 (S75), after which the process returns to S69. If the monitoring processing unit 230 determines that the value of the i counter is equal to or larger than the value of the num_path counter, the process is terminated.

Transmission processing is executed for each node group in this way.

Next, transmission processing will be described with reference to FIG. 17.

The monitoring processing unit 230 causes the communication unit 240b to send a message including the value of the err_num counter to the to-be-monitored node 1X with the serial number n on the i-th Hamilton path (S81). The communication unit 10b in the to-be-monitored node 1X receives the message and replies with an ACK message.

The monitoring processing unit 230 determines whether the communication unit 240b has received an ACK message from the to-be-monitored node 1X with the serial number n within a predetermined time, that is, a time-out has occurred (S83). If the monitoring processing unit 230 determines that a time-out has not occurred, that is, an ACK message has been received from the to-be-monitored node 1X with the serial number n within the predetermined time, the processing by the management node 200b at this stage is terminated.

If the monitoring processing unit 230 determines that a time-out has occurred, that is, an ACK message has not been received from the to-be-monitored node 1X with the serial number n within the predetermined time, the monitoring processing unit 230 indicates an error in an area, in the node data area 252, that is reserved for the serial number n (S85). For example, the monitoring processing unit 230 turns on a relevant error flag.

The monitoring processing unit 230 then increments the err_num counter by one and also increments the n counter by one (S87). The monitoring processing unit 230 determines whether the n counter has reached a to-be-monitored node count $n_{maxi}$ (S89) on the i-th Hamilton path. That is, the monitoring processing unit 230 determines whether a message has been sent from the management node 200b to all to-be-monitored nodes 1X on the i-th Hamilton path.

If the monitoring processing unit 230 determines that the n counter has not reached the to-be-monitored node count $n_{maxi}$, the process returns to S81, where the monitoring processing unit 230 sends a message to a next to-be-monitored node 1X on the Hamilton path.

If the monitoring processing unit 230 determines that the n counter has reached the to-be-monitored node count $n_{maxi}$, this indicates that none of the to-be-monitored nodes 1X is operating normally. In this case, the monitoring processing unit 230 adds the value of the err_num counter, which indicates the number of abnormal nodes, the value being the total to-be-monitored node count $n_{maxi}$, to a value stored in the summary data area 251 (S91). It is assumed that 0 has been stored in the summary data area 251 as an initial value. Then, the process returns to the processing on the calling node.

A message including the value of the err_num counter can be sent for each Hamilton path in this way. If there is no to-be-monitored node 1X that is operating normally, a result indicating this situation is accumulated in the summary data area 251.

Figure 18:
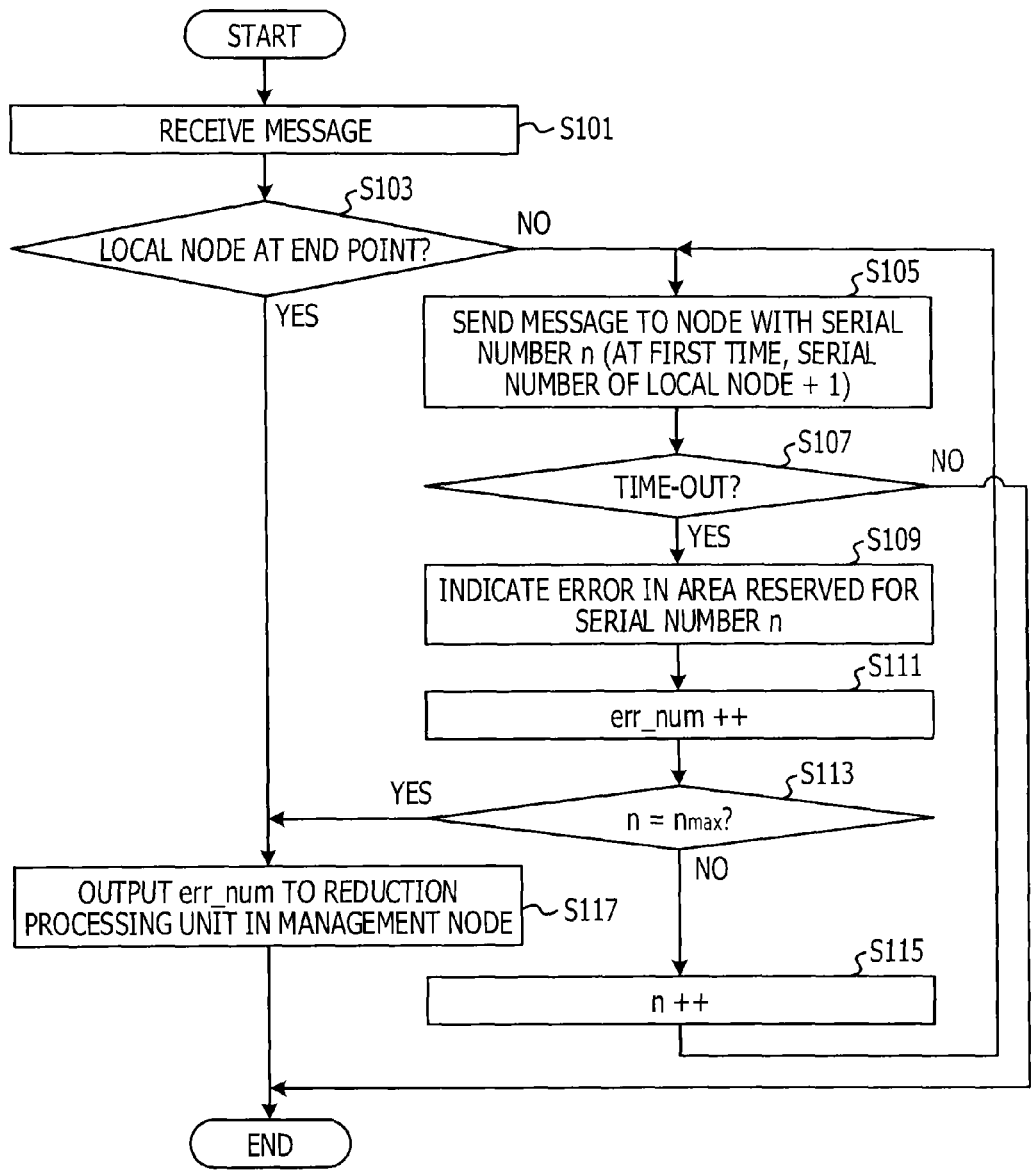
FIG. 18 illustrates a flow of processing executed by the management node according to the second embodiment.

Each to-be-monitored node 1X executes processing illustrated in FIG. 18.

The communication unit 10b in the to-be-monitored node 1X first receives a message including the value of the err_num counter from another apparatus (S101 in FIG. 18) and outputs the value of the err_num counter to the monitoring processing unit 20.

The monitoring processing unit 20 determines whether the local node, to which the monitoring processing unit 20 belongs, is the last node on the Hamilton path (S103). If the monitoring processing unit 20 determines that the local node is the last node, the monitoring processing unit 20 causes the reduction processing unit 12 in the communication unit 10b to call the reduction processing unit 242 in the management node 200b and output the value of the err_num counter to the reduction processing unit 242 (S117). Then, the process is terminated. The reduction function is used in this way to ask the reduction processing unit 242 in the management node 200b to sum the value of the err_num counter.

If the monitoring processing unit 20 determines that the local node is not the last node, the monitoring processing unit 20 identifies the to-be-monitored node 1X with the Hamilton path's serial number n, which is stored in the Hamilton path data storage unit 30 (if this step is first executed, the serial number of the local node plus one is set as n). The monitoring processing unit 20 then causes the communication unit 10b to send a message including the value of the err_num counter to the identified to-be-monitored node 1X (S105).

The monitoring processing unit 20 determines whether the communication unit 10b has received an ACK message from the to-be-monitored node 1X with the serial number n within a predetermined time, that is, a time-out has occurred (S107). If the monitoring processing unit 20 determines that a time-out has not occurred, that is, an ACK message has been received from the to-be-monitored node 1X with the serial number n within the predetermined time, the processing on the to-be-monitored node 1X is terminated.

If the monitoring processing unit 20 determines that a time-out has occurred, that is, an ACK message has not been received from the to-be-monitored node 1X with the serial number n within the predetermined time, the monitoring processing unit 20 commands the RDMA unit 11 to indicate an error in an area reserved for the serial number n, the area being in the node data area 252 in the memory 250 included in the management node 200b, (S109). For example, the monitoring processing unit 20 turns on a relevant error flag. Alternatively, for example, if the local node belongs to a node group with a number in the range from 10,000 to 19,999, the monitoring processing unit 20 calculates a serial number in the entire system by adding n to 10,000 and indicates an error in an area reserved for the node with the serial number in the entire system.

The monitoring processing unit 20 increments the value of the err_num counter by one (S111). The monitoring processing unit 20 then determines whether the n counter has reached the to-be-monitored node count $n_{max}$ on the Hamilton path to which the local node belongs (S113). That is, the monitoring processing unit 20 determines whether a message has been sent from the current to-be-monitored node 1X to all to-be-monitored nodes 1X on the Hamilton path that are set behind the local node.

If the monitoring processing unit 20 determines that the n counter has not yet reached the to-be-monitored node count $n_{max}$, the monitoring processing unit 20 increments the value of the n counter by one (S115). Then, the process returns to S105, where the monitoring processing unit 20 sends a message to a next to-be-monitored node X1 on the Hamilton path.

If the monitoring processing unit 20 determines that the n counter has reached the to-be-monitored node count $n_{max}$, the process proceeds to S117. That is, since there is no normal to-be-monitored node 1X behind the local node on the Hamilton path, the monitoring processing unit 20 notifies the management node 200b.

In the to-be-monitored node 1X, the RDMA unit 11 writes data directly to the memory 250 in the management node 200b through RDMA. Therefore, a processing load on the management node 200b is not increased.

The to-be-monitored node 1X at the end of the to-be-monitored nodes 1X, on the Hamilton path, that operate normally outputs the value of the err_num counter to the reduction processing unit 242 in the management node 200b in S117.

Figure 19:
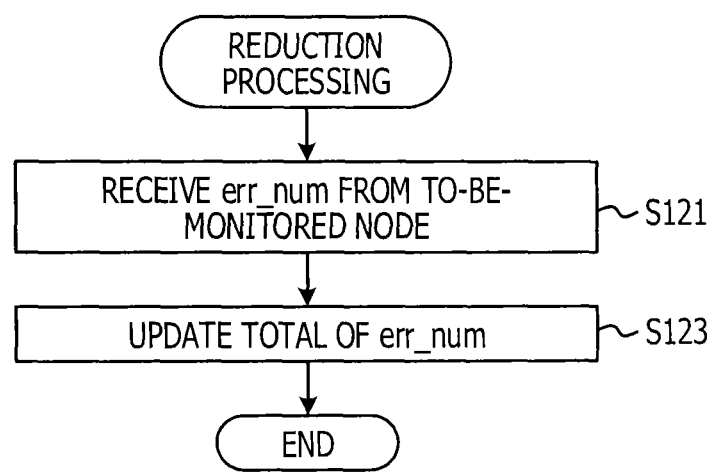
FIG. 19 illustrates a flow of processing executed by a reduction processing unit in the management node according to the second embodiment.

Then, the reduction processing unit 242 in the management node 200b executes processing as illustrated in FIG. 19.

Specifically, the reduction processing unit 242 is called from the to-be-monitored node 1X and receives the value of the err_num counter (S121). The reduction processing unit 242 then updates the total of the err_num counter by adding the received value of the err_num counter to the value stored in the summary data area 251 and writing the resulting value to the summary data area 251 (S123).

When this processing is executed, even if the value of the err_num counter is asynchronously received from the to-be-monitored node 1X that is essentially at the end of each Hamilton path, the value stored in the summary data area 251 is updated as processing by the communication unit 240b. Therefore, a processing load on the central processing unit (CPU) in the management node 200b can be suppressed.

Although both the first and second embodiments have been described by assuming an N-dimensional mesh, the effects described above can be obtained by executing similar processing on an N-dimensional torus. In the case of a torus, the to-be-monitored node at the start point on a Hamilton path and the to-be-monitored node at the end point may be the same. However, it suffices for the node to operate as the node at the start point if a node from which a message is sent is a management node, and to operate as the node at the end point if a node from which a message is sent is another to-be-monitored node.

This completes the descriptions of the embodiments of the present technology. The present technology is not limited to these embodiments. For example, the functional blocks described above may not necessarily match the structure of parts of the apparatus or its program module structure.

Although examples of sending and receiving a message including the value of the err_num counter have been described, other data may be included in a message. For example, a bit string corresponding to to-be-monitored nodes present on the route on a Hamilton path may be included in a message. If a to-be-monitored node to which to send the message is found to be abnormal, the bit corresponding to the abnormal to-be-monitored node to which to send the message may be turned on.

Furthermore, the order in which a processing flow is executed may be changed if the processing result remains unchanged. Alternatively, a plurality of steps may be concurrently executed.

Figure 20:
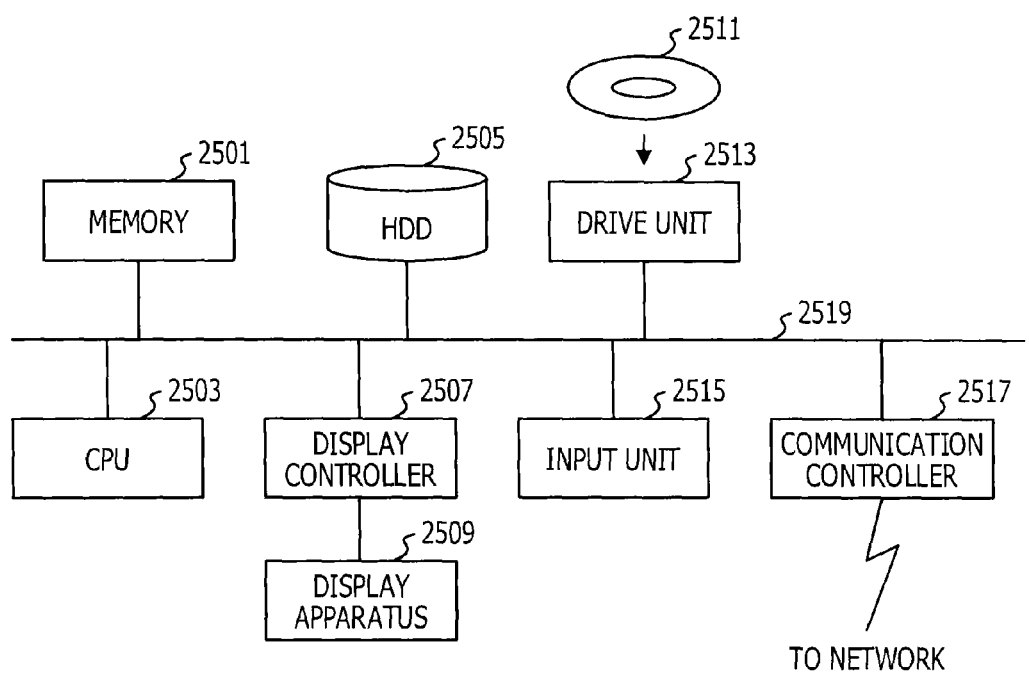
FIG. 20 is a functional block diagram of a computer.

The management nodes 200 and 200b and the to-be-monitored nodes 1 and 1X are each a computer apparatus. As illustrated in FIG. 20, the computer apparatus includes a memory 2501, a CPU 2503, a hard disk drive (HDD) 2505, a display controller 2507 coupled to a display apparatus 2509, a drive unit 2513 for a removable disk 2511, an input unit 2515, and a communication controller 2517 coupled to a network; these components are mutually coupled through a bus 2519. An OS and application programs that execute processing in the embodiments of the present technology are stored in the HDD 2505. When these programs are executed by the CPU 2503, they are read out from the HDD 2505 and stored in the memory 2501. The CPU 2503 controls the display controller 2507, communication controller 2517, and drive unit 2513 according to the processing executed by the application program so that the application program operates as predetermined. Data during processing is stored mainly in the memory 2501. However, the data may be stored in the HDD 2505. In the embodiments of the present technology, the application programs that execute the processing described above are distributed in the form of being stored on the removable disk 2511, which is computer-readable, and are installed from the drive unit 2513 in the HDD 2505. In some cases, the application programs are installed in the HDD 2505 through a network such as the Internet and the communication controller 2517. In this type of computer apparatus, hardware components such as the CPU 2503 and memory 2501 described above and programs such as the OS and application programs efficiently cooperate to implement the functions described above.

The communication controller 2517 corresponds to communication unit 240 in the management node 200 or to the communication unit 240b in the management node 200b. Alternatively, the communication controller 2517 corresponds to the communication unit 10 in the to-be-monitored node 1 or to the communication unit 10b in the to-be-monitored node 1X. That is, the communication controller 2517 has an RDMA function and a reduction function.

The embodiments described above will be summarized below.

The systems according to the embodiments each include a plurality of information processing apparatuses that are coupled through a communication path and a management apparatus that manages the plurality of information processing apparatuses. The management apparatus sends a message, which includes information about a detected abnormal condition, to a first information processing apparatus that is operating normally, the first information processing apparatus being one of the plurality of information processing apparatuses on a Hamilton path, which is set for the plurality of information processing apparatuses. When each of the plurality of information processing apparatuses receives a message, if a next information processing apparatus that is operating normally is present on the Hamilton path, the information processing apparatus sends a message including information about abnormal conditions that have been detected so far to the next information processing apparatus that is operating normally. If a next information processing apparatus that is operating normally is unable to be detected on the Hamilton path or the information processing apparatuses that has received the message is the information processing apparatus at the end of the Hamilton path, the information processing apparatus sends information about abnormal conditions that have been detected so far to the management apparatus.

Thus, a processing load to detect an abnormal condition can be reduced in the entire system. Specifically, in principle, only one message transmission and reception is sufficient at each information processing apparatus. At the management apparatus, in principle, the number of message transmissions is suppressed to one on each Hamilton path, and the number of receptions of information about a detected abnormal condition is also suppressed to one on each Hamilton path. In transmission of information about a detected abnormal condition to the management apparatus, a message may be used or RDMA may be used.

Each of the plurality of information processing apparatuses searches for a next information processing apparatus, on the Hamilton path, that is operating normally. If the information processing apparatus detects an abnormal information processing apparatus, the information processing apparatus may write data about the abnormal information processing apparatus to a memory in the management apparatus. When RDMA is used in this way, a processing load on the processor in the management apparatus can be reduced.

The management apparatus described above may send a message including information about a detected abnormal condition to a first normally operating information processing apparatus of a plurality of information processing apparatuses on a Hamilton path that is set for one of a plurality of groups to which one of the plurality of information processing apparatuses belongs. If the management apparatus receives the information about abnormal conditions that have been detected so far for each of the plurality of groups, the management apparatus may summarizes the information. If a Hamilton path is set for each group of information processing apparatuses, processing is concurrently executed in a case in which many information processing apparatuses are handled, so processing time can be shortened.

Programs that cause a computer to execute processing as described above can be created. These programs are stored, for example, on a computer-readable recording medium or in a storage unit; examples of the computer-readable recording medium include a flexible disk, optical disks such as a compact disk-read-only memory (CD-ROM), a magneto-optic disk, a semiconductor memory (such as, for example, a ROM), and a hard disk. Data being processed is temporarily stored in a storage unit such as a random-access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
a plurality of information processing apparatuses that are mutually coupled through a communication path; and
a management apparatus that manages the plurality of information processing apparatuses,
wherein the management apparatus is configured to:
transmit Hamilton path information including a communication route information and order information indicating a position in a communication order, the position being assigned to each of the plurality of information processing apparatuses, to each of the plurality of information processing apparatuses, and
transmit, according to the communication order, a first message to one or more information processing apparatuses that are free from an abnormal condition among the plurality of information processing apparatuses, and
the one or more information processing apparatuses are configured to:
transmit, when the first message is received, a second message including information about an abnormal condition that has been detected so far to a next information processing apparatus of the plurality of information processing apparatuses that is free from an abnormal condition, and
transmit the information about an abnormal condition that has been detected so far to the management apparatus when the next information processing apparatus fails to be identified.

2. The system according to claim 1, wherein the next information processing apparatus is configured to:
receive the second message from one of the one or more information processing apparatuses;
determine whether the next information processing apparatus is at an end point on the Hamilton path; and
transmit the information about an abnormal condition that has been detected so far to the management apparatus, when it is determined that the next information processing apparatus is at the end point.

3. The system according to claim 1, wherein each of the plurality of information processing apparatuses is configured to store information about the abnormal information processing apparatus in a memory in the management apparatus when an abnormal information processing apparatus is detected.

4. The system according to claim 1, wherein each of the one or more information processing apparatuses is configured to:
determine that a transmission destination to which the second message has been transmitted is not abnormal when a response message is received from the transmission destination within a predetermined time after the second message had been transmitted, and
determine that the transmission destination to which the second message has been transmitted is abnormal when a response message is not received from the transmission destination within the predetermined time after the second message has been transmitted.

5. The system according to claim 1, wherein the management apparatus is configured to:
divide the plurality of information processing apparatuses into a plurality of groups,
set the Hamilton path for each of the plurality of groups, and
transmit the first message to an information processing apparatus at a first position in the communication order, the information processing apparatus being included in each of the plurality of groups.

6. The system according to claim 5, wherein the management apparatus is configured to summarize the information about the abnormal condition that has been detected so far when the information about the abnormal condition that has been detected so far are received from each of the plurality of groups.

7. The system according to claim 1, wherein the management apparatus is configured to transmit, to each of the plurality of information processing apparatuses, the Hamilton path information about one or more information processing apparatuses that are behind a transmission destination in the communication order on the Hamilton path.

8. The system according to claim 1, wherein the information about an abnormal condition includes info ration about a number of information processing apparatuses in which there is an abnormal condition.

9. An abnormal condition detection method executed by a system that includes a plurality of information processing apparatuses that are mutually coupled through a communication path and also includes a management apparatus that manages the plurality of information processing apparatuses, the abnormal condition detection method comprising:

transmitting, by the management apparatus, Hamilton path information including a communication route information and order information indicating a position in a communication order, the position being assigned to the each of the plurality of information processing apparatuses, to each of the plurality of information processing apparatuses;

transmitting, by the management apparatus, according to the communication order, a first message to one or more information processing apparatuses that are free from an abnormal condition among the plurality of information processing apparatuses;

transmitting, by the one or more information processing apparatuses, when the first message is received, a second message including information about an abnormal condition that has been detected so far to a next information processing apparatus of the plurality of information processing apparatuses that is free from an abnormal condition and transmitting, by the one or more information processing apparatuses, the information about an abnormal condition that has been detected so far to the management apparatus, when the next information processing apparatus fails to be identified.

10. The abnormal condition detection method according to claim 9, further comprising:

receiving, by the next information processing apparatus, the second message from one of the one or more information processing apparatuses:

determining whether the next information processing apparatus is at an end point on the Hamilton path; and transmitting the information about an abnormal condition that has been detected so far to the management apparatus, when it is determined that the next information processing apparatus is at the end point.

11. The abnormal condition detection method according to claim 9, further comprising storing, by each of the plurality of information processing apparatuses, information about the abnormal information processing apparatus in a memory in the management apparatus when an abnormal information processing apparatus is detected.

12. The abnormal condition detection method according to claim 9, further comprising:

determining, by the one or more information processing apparatuses, that a transmission destination to which the second message has been transmitted is not abnormal when a response message is received from the transmission destination within a predetermined time after the second message had been transmitted; and determining, by the one or more information processing apparatuses, that the next information processing apparatus to which the second message has been transmitted is abnormal when a response message is not received from the next information processing apparatus within the predetermined time after the second message has been transmitted.

13. The abnormal condition detection method according to claim 9, further comprising:

dividing, by the management apparatus, the plurality of information processing apparatuses into a plurality of groups; and setting the Hamilton path for each of the plurality of groups, wherein the transmitting the first message includes transmitting the first message to an information processing apparatus at a first position in the communication order, the information processing apparatus being included in each of the plurality of groups.

14. The abnormal condition detection method according to claim 13, further comprising:

summarizing, by the management apparatus, the information about the abnormal condition that has been detected so far when the information about the abnormal condition that has been detected so far are received from each of the plurality of groups.

15. The abnormal condition detection method according to claim 9, further comprising transmitting, by the management apparatus, to each of the plurality of information processing apparatuses, the Hamilton path information about one or more information processing apparatuses that are behind a transmission destination in the communication order on the Hamilton path.

16. The abnormal condition detection method according to claim 9, wherein the information about an abnormal condition includes information about a number of information processing apparatuses in which there is an abnormal condition.

* * * * *